(12) United States Patent
Kira et al.

(10) Patent No.: US 9,303,535 B2
(45) Date of Patent: Apr. 5, 2016

(54) OIL CONTROL VALVE MOUNTING ARRANGEMENT

(75) Inventors: Naoki Kira, Nagoya (JP); Takahiro Inokuchi, Chiryu (JP); Atsushi Nishigaki, Anjo (JP); Kenji Nonaka, Chiryu (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 734 days.

(21) Appl. No.: 13/120,304

(22) PCT Filed: Dec. 16, 2009

(86) PCT No.: PCT/JP2009/070977
§ 371 (c)(1),
(2), (4) Date: Mar. 22, 2011

(87) PCT Pub. No.: WO2010/071151
PCT Pub. Date: Jun. 24, 2010

(65) Prior Publication Data
US 2011/0168276 A1    Jul. 14, 2011

(30) Foreign Application Priority Data

Dec. 18, 2008 (JP) .................................. 2008-322693
Mar. 23, 2009 (JP) .................................. 2009-070730

(51) Int. Cl.
*F16L 3/00* (2006.01)
*F01L 1/344* (2006.01)
(Continued)

(52) U.S. Cl.
CPC ........ *F01L 1/344* (2013.01); *F01M 1/16* (2013.01); *F16K 27/041* (2013.01);
(Continued)

(58) Field of Classification Search
CPC ..... F16K 3/202; F16K 27/04; F16K 31/0668; F16K 27/041; F16K 31/0613; Y10T 137/86702; Y10T 137/6851; Y10T 137/7036; F01L 1/344; F01L 2001/34426; F01L 2001/3443; F01L 2001/34433; F01L 2001/34479; F01L 2103/00; F01L 2101/00; F01M 1/16
USPC ............... 137/625.68, 343, 375; 251/366
See application file for complete search history.

(56) References Cited

U.S. PATENT DOCUMENTS 4,753,416 A * 6/1988 Inagaki et al. ........... 137/625.65
5,058,932 A * 10/1991 Mackal ..................... 285/200
(Continued)

FOREIGN PATENT DOCUMENTS

CN    1807866 A    7/2006
EP    1 884 629 A1    2/2008
(Continued)

OTHER PUBLICATIONS

Machine translation for JP2009-222015, Sep. 25, 2013, JPO website, all pages.*
(Continued)

*Primary Examiner* — Craig J Price
(74) *Attorney, Agent, or Firm* — Buchanan Ingersoll & Rooney PC

(57) ABSTRACT

An oil control valve mounting arrangement includes a resin cover 5 with a metal cylindrical body 4 insert-molded therein, a valve sleeve 3 housed within the cylindrical body 4, and a spool 2 inserted in the valve sleeve 3.

In at least at one end portion 14 of the cylindrical body 4 in the axial direction of the valve sleeve 3, the cover 5 includes an engaging portion 19 engageable with an interior-facing face 15b of the cylindrical body 4 facing the radially inner side of the valve sleeve 3 at an end of the cylindrical body 4 in the axis direction of the valve sleeve 3 so as to restrict displacement of the cover 5 away from the cylindrical body 4 in the radial direction of the valve sleeve 3.

18 Claims, 6 Drawing Sheets

(51) Int. Cl.
  *F01M 1/16* (2006.01)
  *F16K 27/04* (2006.01)
  *F16K 31/06* (2006.01)

(52) U.S. Cl.
  CPC .... *F16K 31/0613* (2013.01); *F01L 2001/3443* (2013.01); *F01L 2001/34426* (2013.01); *F01L 2001/34433* (2013.01); *F01L 2001/34479* (2013.01); *F01L 2101/00* (2013.01); *F01L 2103/00* (2013.01); *Y10T 137/6851* (2015.04)

(56) References Cited

U.S. PATENT DOCUMENTS

| | | | |
|---|---|---|---|
| 5,075,066 | A | 12/1991 | Terada et al. |
| 6,118,361 | A * | 9/2000 | Ogawa ............................. 336/96 |
| 7,121,243 | B2 | 10/2006 | Yoshijima et al. |
| 7,174,868 | B2 * | 2/2007 | Yoshijima et al. ......... 123/90.38 |
| 7,532,100 | B2 * | 5/2009 | Henry et al. ................... 336/198 |
| 7,766,040 | B2 * | 8/2010 | Bamber .................... 137/625.26 |
| 8,231,818 | B2 * | 7/2012 | Bamber .................... 137/625.26 |
| 2003/0201020 | A1 | 10/2003 | Kulmann |
| 2006/0027199 | A1 | 2/2006 | Yoshijima et al. |
| 2006/0112916 | A1 | 6/2006 | Yoshijima et al. |
| 2009/0235892 | A1 | 9/2009 | Sumiya et al. |
| 2009/0301427 | A1 | 12/2009 | Kojima et al. |
| 2010/0243934 | A1 * | 9/2010 | Kira et al. ................. 251/129.15 |
| 2011/0233447 | A1 * | 9/2011 | Anno et al. ................... 251/366 |

FOREIGN PATENT DOCUMENTS

| | | |
|---|---|---|
| FR | 2 874 057 A1 | 2/2006 |
| JP | 2-164305 A | 6/1990 |
| JP | 3525709 B2 | 2/2004 |
| JP | 3714131 B2 | 11/2005 |
| JP | 2006-46192 A | 2/2006 |
| JP | 2006-152969 A | 6/2006 |
| JP | 2007-35393 A | 2/2007 |
| JP | 2007-064363 A | 3/2007 |
| JP | 2007-107479 A | 4/2007 |
| JP | 2009-222015 A | 10/2009 |

OTHER PUBLICATIONS

Notification of Transmittal of Translation of the International Preliminary Report on Patentability (Form PCT/IB/338) dated Jul. 14, 2011, International Preliminary Report of Patentability (Form PCT/IB/373) and Written Opinion of the International Searching Authority (Form PCT/ISA/237) dated Jul. 5, 2011, issued in corresponding International Patent Application No. PCT/JP2009/070977.

Office Action (Notification of the First Office Action) dated Sep. 21, 2012, issued by the Chinese Patent Office in corresponding Chinese Patent Application No. 200980137479.0, and an English translation of the Office Action. (15 pages).

International Search Report (PCT/ISA/210) issued on Feb. 9, 2010, by Japanese Patent Office as the International Searching Authority for International Application No. PCT/JP2009/070977.

Written Opinion (PCT/ISA/237) issued on Feb. 9, 2010, by Japanese Patent Office as the International Searching Authority for International Application No. PCT/JP2009/070977.

Extended European Search Report dated Feb. 10, 2012, issued in the corresponding European Patent Application No. 09833454.3—1263/2327912. (5 pages).

* cited by examiner

OIL CONTROL VALVE MOUNTING ARRANGEMENT

TECHNICAL FIELD

The present invention relates to an oil control valve mounting arrangement including a resin cover with a metal cylindrical body insert-molded therein, a valve sleeve housed within the cylindrical body, and a spool inserted in the valve sleeve.

BACKGROUND ART

Conventionally, in an oil control valve mounting arrangement, an opening is formed in an upper wall of a cylinder head cover and a valve case accommodating an oil control valve covers this opening from the upper side of the cylinder head cover. With this, by utilizing the opening, there is formed an oil passageway communicating the oil control valve to a valve timing adjusting mechanism (Patent Document 1).

Further, in the oil control valve mounting arrangement, there is a need for ensuring sealing between e.g. a cylinder head cover formed of resin and the cylindrical body in order to prevent such phenomenon of leaking of oil or the like to the outside of the cover via the boundary face relative to the metal cylindrical body insert-molded in this cover.

With the above-described conventional oil control valve mounting arrangement, a peripheral groove is formed in the outer peripheral portion of the cylindrical body and an amount of adhesive agent is applied in advanced to the inner surface of this peripheral groove at the time of insert molding. Then, with curing of this adhesive agent, the sealing is ensured (see, e.g. Patent Document 2).

PRIOR ART DOCUMENTS

Patent Documents

Patent Document 1: Japanese Patent No. 3525709
Patent Document 2: Japanese Patent Application "Kokai" No. 2007-107479

SUMMARY OF THE INVENTION

Problems to be Solved by Invention

In the case of the arrangement or apparatus disclosed in Patent Document 1, an annular seating face is formed in the top deck face of the cylinder head cover. And, the valve case is fixed to this seating face with using a plurality of set bolts. With such arrangement involving bolt fastening, the construction for forming the bolt attaching portions is apt to be complicated and the total weight is increased by the bolts disadvantageously.

In the case of the arrangement or apparatus disclosed in Patent Document 2, due to e.g. elastic or plastic deformation of the resin cover resulting from its thermal expansion and/or reaction from the sealing material or temporal change in the resin cover, the cover tends to be displaced away from the metal cylindrical body in the radial direction of this body, which displacement can lead to exfoliation or detachment of the adhesive bond between the cover and the cylindrical body, thus impairing the sealing therebetween.

The present invention has been made in view of the above-described state of the art and its object is to provide an oil control valve mounting arrangement that provides, by a simple construction, superior sealing between the cover and the cylindrical body.

Solution to Accomplish Object

According to a first characterizing feature of the present invention, an oil control valve mounting arrangement comprises a resin cover with a metal cylindrical body insert-molded therein, a valve sleeve housed within the cylindrical body, and a spool inserted in the valve sleeve;

wherein in at least at one end portion of the cylindrical body in the axial direction of the valve sleeve, the cover includes an engaging portion engageable with an interior-facing face of the cylindrical body facing the radially inner side of the valve sleeve at an end of the cylindrical body in the axis direction of the valve sleeve so as to restrict displacement of the cover away from the cylindrical body in the radial direction of the valve sleeve.

Function and Effect

With the above-described oil control valve mounting arrangement, in at least at one end portion of the cylindrical body, engagement is established between an interior-facing face of the cylindrical body and an engaging portion of the cover. Hence, the displacement of the cover from the cylindrical body in the radial direction of the valve sleeve can be restricted with such simple construction.

Therefore, even when the cover tends to be displaced relative to the metal cylindrical body in the radial direction of the valve sleeve due to e.g. elastic or plastic deformation of the resin cover resulting from its thermal expansion and/or reaction from the sealing material or temporal change in the resin cover, the sealing performance between the cover and the cylindrical body will hardly be impaired, so that the sealing performance can readily be ensured.

According to the second characterizing feature of the present invention, said interior-facing face and an exterior-facing face at one end portion of the cylindrical body are surrounded by and held within said engaging portion.

Function and Effect

As the cover is molded such that the interior-facing face and an exterior-facing face of the cylindrical body at one end portion of the cylindrical body are surrounded by and held within the engaging portion as provided in the above-described construction, the insert molding operation is readily possible in such a way as to restrict the displacement of the cover way from the cylindrical body in the radial direction of the valve sleeve.

According to the third characterizing feature of the present invention, in at least one end portion of the cylindrical body in the axial direction of the valve sleeve, the cylindrical body includes a flange forming an inner peripheral face having a greater diameter than the diameter of the valve sleeve.

Function and Effect

With the above-described construction, engagement is established between the inner peripheral face of the flange formed in the cylindrical body and the engaging portion. As this flange can be formed by causing one end portion of the cylindrical body to project, the engagement with the engaging portion can be established by such simple construction.

According to the fourth characterizing feature of the present invention, an inner peripheral face and an outer peripheral face of the flange are surrounded by and held within said engaging portion.

Function and Effect

With the above-described construction, as the cover is molded such that an inner peripheral face and an outer peripheral face of the flange are surrounded by and held within the engaging portion, the insert molding operation is readily possible in such a way as to restrict the displacement of the cover away from the cylindrical body in the radial direction of the valve sleeve.

According to the fifth characterizing feature of the present invention, said engaging portion includes a parallel face that extends parallel with the axial direction of the valve sleeve and that is engageable with the inner peripheral face.

Function and Effect

With the provision of a parallel face engageable with the inner peripheral face as provided in the above-described construction, the engaging boundary face between the interior-facing face and the engaging portion becomes parallel with the axial direction of the valve sleeve. As this engaging boundary face functions as a boundary face perpendicular to the force that tends to displace the cover away from the cylindrical body in the radial direction of the valve sleeve, the displacement of the cover away from the cylindrical body in the radial direction of the valve sleeve can be restricted in a reliable manner.

According to the sixth characterizing feature of the present invention, a sealing member is provided between said engaging portion and the valve sleeve.

Function and Effect

With this construction, the sealing member provided between the engaging portion and the valve sleeve can prevent leakage of oil or the like through the boundary face between the cover portion and the cylindrical body and leakage of oil or the like through the boundary face between the cylindrical body and the valve sleeve.

According to the seventh characterizing feature of the present invention, a sealing member contacting said engaging portion is provided closer to the axis of the valve sleeve than said cover.

Function and Effect

With the above-described construction, the sealing member provided closer to the axis of the valve sleeve than said cover can prevent leakage of oil or the like through the boundary face between the cover portion and the cylindrical body and leakage of oil or the like through the boundary face between the cylindrical body and the valve sleeve.

According to the eighth characterizing feature of the present invention, in the other end portion of the cylindrical body in the axial direction of the valve sleeve, the cover includes a restricting portion for restricting movement of the cylindrical body.

Function and Effect

With the above-described restricting portion, movement of the cylindrical body in the axial direction of the valve sleeve due to e.g. elastic or plastic deformation of the resin cover resulting from its thermal expansion and/or reaction from the sealing material or temporal change in the resin cover can be restricted. With this, the sealing performance between the cover and the cylindrical body will hardly be impaired, so that the sealing performance can readily be ensured.

According to the ninth characterizing feature of the present invention, said restricting portion is formed to extend toward the axis of the valve sleeve.

Function and Effect

With the above-described construction, the restricting portion can be formed to extend from the exterior-facing face toward the interior-facing face of the cylindrical body. With this, even when the cylindrical body tends to be moved in the axial direction of the valve sleeve, the cylindrical body comes into contact with the restricting portion. Therefore, the movement of the cylindrical body in the axial direction of the valve sleeve can be restricted in a reliable manner.

According to the tenth characterizing feature of the present invention, said restricting portion is configured to come into contact with the face on the other end portion of the cylindrical body in the axial direction of the valve sleeve.

Function and Effect

With the above-described construction, even when the cylindrical body tends to be moved in the axial direction of the valve sleeve, the end face of the other end portion of the cylindrical body comes into contact with the restricting portion. Therefore, the movement of the cylindrical body can be restricted immediately.

According to the eleventh characterizing feature of the present invention, at one end portion of the cylindrical body in the axial direction of the valve sleeve, the cylindrical body includes a radial hole extending through in the radial direction of the valve sleeve and said engaging portion includes a convex portion engageable with said radial hole.

Function and Effect

With the above-described construction, at the time of the molding operation of the cover, it is possible to create a flow of resin flowing through the radial hole and a further flow of resin flowing past the perimeter of one end portion of the cylindrical body. Therefore, even if there occurs a drop in the injection pressure of the resin during the molding operation, with either one of these resin flows, the resin can be distributed with ease in a uniform manner to form the engaging portion as a whole. That is, as it is possible to prevent occurrence of any area not filled with resin, the cover as a whole can be molded in a reliable manner.

Furthermore, as the radial hole is filled with the resin, the bonding between the cover and the one end portion of the cylindrical body can be further reinforced. So, the sealing performance therebetween can be further free from impairment.

According to the twelfth characterizing feature of the present invention, of faces of the engaging portion, one face thereof in opposition to the valve sleeve is positioned more outward in the radial direction of the valve sleeve than a face of the cylindrical body in opposition to the valve sleeve.

Function and Effect

With the above-described construction wherein one face of the engaging portion in opposition to the valve sleeve is positioned more outward in the radial direction of the valve sleeve than a face of the cylindrical body in opposition to the valve sleeve, there is formed a step between these two faces. With this, when, at the time of resin molding operation, a slide pin is inserted into the cylindrical body and an amount of resin is charged therein for forming the cover, intrusion or leakage of the resin between the slide pin and the cylindrical body can be effectively restricted. Namely, adhesion of resin to the inner surface of the cylindrical body occurs only if and after the resin leaks into any gap between the slide pin and the cylindrical body. Then, by providing a step as provided in the above-described construction, such leakage of resin between the slide pin and the cylindrical body hardly occurs.

Further, with this construction, as the inner diameter of the cover on the side of the engaging portion can be set larger than the inner diameter of the cylindrical body, the insertion of the valve sleeve from the side of the engaging portion can be facilitated.

According to the thirteenth characterizing feature of the present invention, of faces of the engaging portion, one face thereof in opposition to the valve sleeve has a tapered portion which progressively reduces the radial length of the valve sleeve.

Function and Effect

In the slide pin to be inserted at the time of the molding operation, if a portion thereof coming into contact with the tapered portion is provided with a shape corresponding to this tapered portion, in the course of removal of this slide pin, the slide pin can be oriented at an angle facilitating detachment of the slide pin from the solidified resin. Therefore, the removal of the slide pin can be facilitated and can be effected smoothly.

MODES OF EMBODYING THE INVENTION

Next, embodiments of the present invention will be described with reference to the accompanying drawings.

First Embodiment

Figure 1:
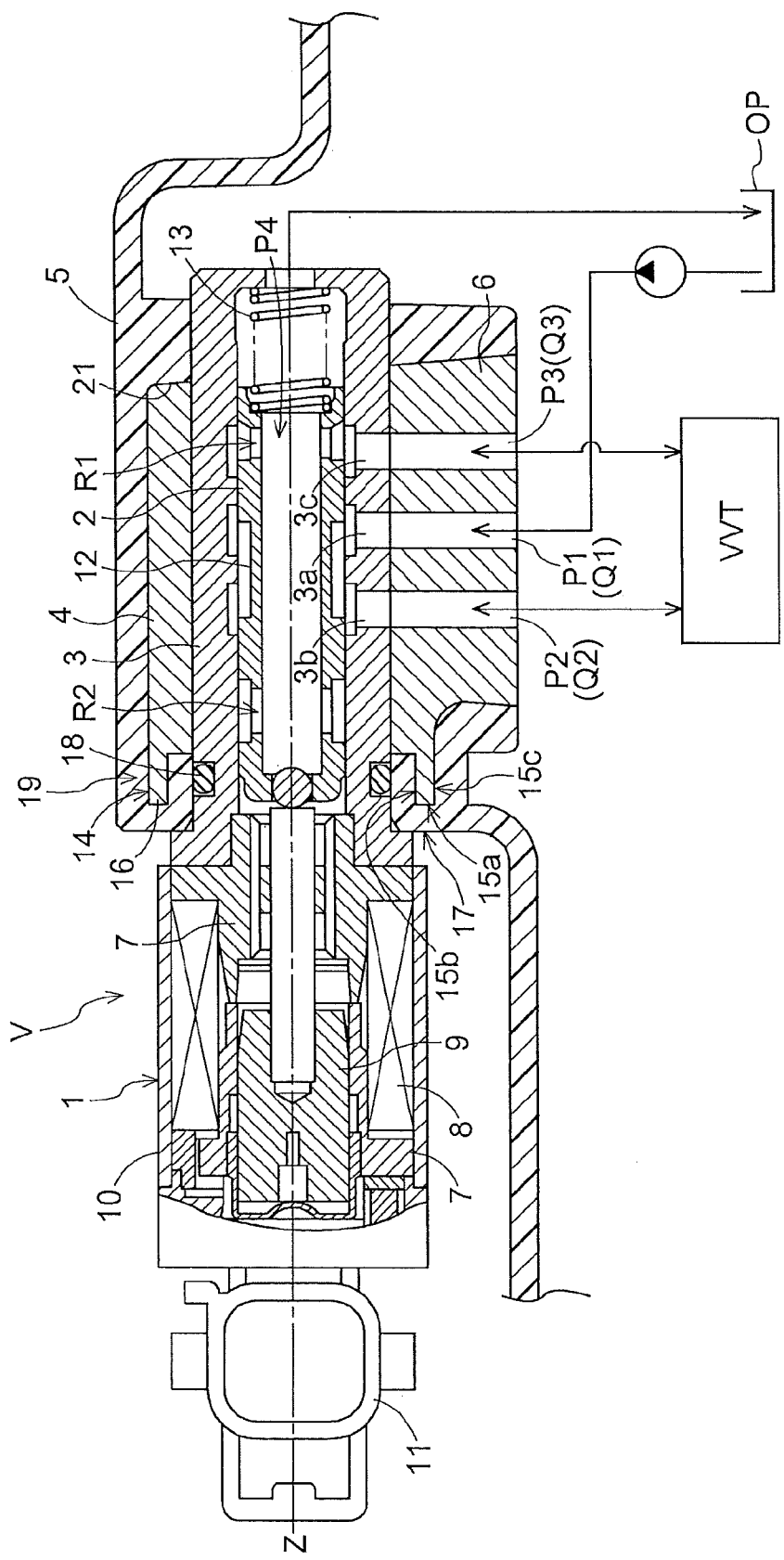
FIG. 1 is a top plan view showing a vertical section of an oil control valve mounting arrangement.

FIG. 1 shows a mounting arrangement according to the present invention for an oil control valve V to be mounted in an automobile engine (an example of an internal combustion engine).

The oil control valve V includes a solenoid mechanism 1 that is duty-controlled by signals from an unillustrated engine control unit (ECU), a spool 2 driven by the solenoid mechanism 1, and a cylindrical valve sleeve 3 in which the spool 2 is inserted.

The valve sleeve 3 is housed within a cylindrical body 4 made of a metal (an aluminum alloy) and the sleeve 3 is fixed to a resin-formed, cylinder head cover 5 through an unillustrated bracket with using unillustrated screws.

The cylindrical body 4 includes an oil passageway forming block 6 formed integral therewith and the body 4 is insert-molded within the cylinder head cover 5, with an outer peripheral side thereof being covered with resin.

The oil control valve V receives a supply of work oil from a hydraulic pump P through a first oil passageway P1 formed in the oil passageway forming block 6.

The oil control valve V also supplies work oil to a valve timing control device (hydraulic operated mechanism) VVT through a second oil passageway P2 or a third oil passageway P3 formed in the oil passageway forming block 6 and discharges the work oil to an oil pan OP through a drain oil passageway P4 formed inside the spool 2.

The solenoid mechanism 1 consists essentially of a cylindrical bobbin sub assembly 8 comprised of a length of coil wound around the outer periphery of an approximately cylindrical yoke 7, a needle iron core 9, a case 10, a connector 11, etc., with the yoke 7 being pressure-inserted into an end of the valve sleeve 3.

The spool 2 is housed within the valve sleeve 3 to be slidable along its axial direction.

The spool 2 defines radial oil passageways R1, R2 communicating the outer peripheral portion of this spool 2 to the drain oil passageway P4. Further, in the outer peripheral portion of the spool 2, a spool groove 12 is formed.

The valve sleeve 3 forms, in juxtaposition along its axial direction, a first portion 3a, and a second port 3b and a third port 3c for feeding/discharging work oil.

The oil passageway forming block 6 forms a first communication passageway Q1 communicated to the first port 3a, a second communication passageway Q2 communicated to the second port 3b, and a third communication passageway Q3 communicated to the third port 3c.

Between the inner end portion of the valve sleeve 3 and an end portion of the spool 2, there is mounted a compression spring 13. This compression spring 13 is disposed in such that one end thereof comes into contact with a stepped portion formed inside the valve sleeve 3 and its other end comes into contact with a stepped portion formed in the drain oil passageway P4 of the spool 2.

Figure 2:
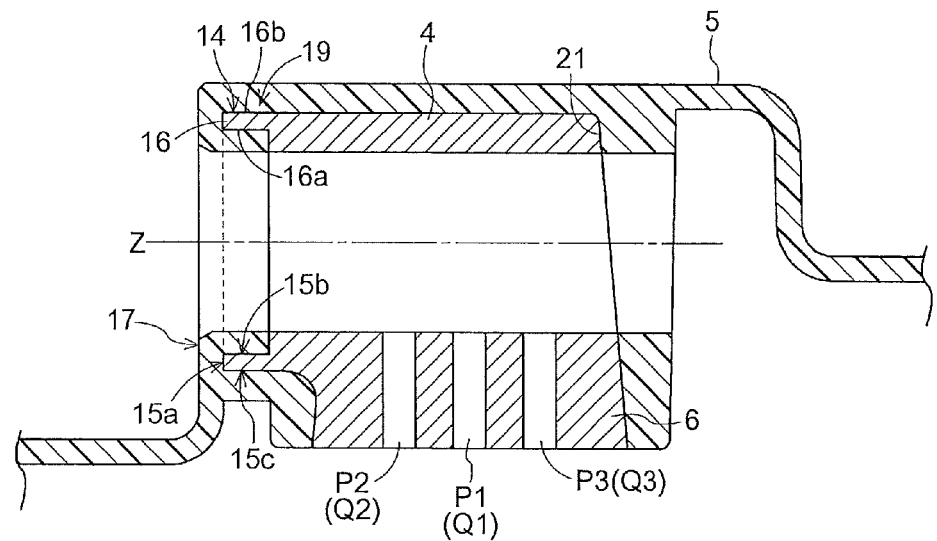
FIG. 2 is a section view showing a vertical section of principal portions.
Figure 3:
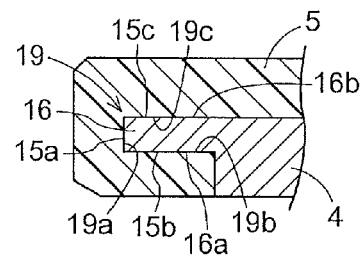
FIG. 3 is a section view showing a vertical section of principal portions.

Referring more particularly to the cylindrical body 4 and the cylinder head cover 5, as shown in FIG. 2 and FIG. 3, in at least at one end portion 14 of the cylindrical body 4 in the axial direction Z of the valve sleeve 3, more particularly, at one end portion 14 close to the outer face of the cylinder head cover 5, in order to restrict displacement of the cylinder head cover 5 away from the cylindrical body 4 in the radial direction of the valve sleeve 3, the cylinder head cover 5 includes an engaging portion 19 engageable with an interior-facing face 15b facing the radial inside of the valve sleeve 3 at the one end portion 14 of the cylindrical body 4 in the axis Z direction of the valve sleeve 3.

Specifically, an end face engaging part 19a, an interior-facing face engaging part 19b and an exterior-facing face engaging part 19c of the engaging portion 19 are in engagement with the end face 15a, the interior-facing face 15b and the exterior-facing face 15c of the cylindrical body 4, respectively.

In this way, the interior-facing face 15b and the exterior-facing face 15c at one end portion 14 of the cylindrical body 4 are surrounded by and held within the engaging portion 19.

The engaging portion 19 further includes the interior-facing face engaging part 19b engageable in flush with the interior-facing face 15b facing the radial interior of the valve sleeve 3. In the instant embodiment, this interior-facing face engaging part 19b is provided as a parallel face that extends parallel with the axis Z direction of the valve sleeve 3. In this parallel face, its boundary faces engaging with the interior-facing face 15b and the engaging portion 19 extend parallel with the axis Z direction. In this, as these boundary faces act as boundary faces perpendicular to the stress that tends to displace the cylinder head cover 5 away from the cylindrical body 4 in the radial direction of the valve sleeve 3. Therefore, such displacement of the cylinder head cover 5 away from the cylindrical body 4 in the radial direction of the valve sleeve 3 can be restricted in a reliable manner.

More particularly, in at least at the one end portion 14 of the cylindrical body 4 in the axis Z direction of the valve sleeve 3, there is provided a flange 16 forming an inner peripheral face 16a having a larger diameter than the diameter of the valve sleeve 3.

That is, the inner diameter at the one end portion 14 of the cylindrical body 4 is rendered larger than the outer diameter of the valve sleeve 3, and the flange 16 is formed cylindrical. Then, the insert-molding operation is effected such that the inner peripheral face 16a and the outer peripheral face 16b of this flange 16 are surrounded, along the entire perimeter thereof, by and held within the engaging portion 19, whereby the cylindrical body 4 and the engaging portion 19 of the cylinder head cover 5 are engaged with each other.

Further, an O-ring like elastic sealing member 18 is provided between the valve spool 3 and the engaging portion 19 of a cover portion 17 surrounding and holding the one end portion 14 (flange 16) of the cylindrical body 4.

Incidentally, the insert molding operation may be effected such that the cylindrical boy 4 is bonded to the cylinder head cover 5 with adhesive agent.

At the other end portion 20 of the cylindrical body 4 in the axis Z direction of the valve sleeve 3, the cylinder head cover 5 forms a restricting portion 21 for restricting movement of the cylindrical body 4. Wit this restricting portion, it is possible to restrict movement of the cylindrical body 4 in the axis Z direction of the valve sleeve 3.

The restricting portion 21 is formed to extend in the axis Z direction of the valve sleeve 3. When the cylindrical body 4 attempts to move in the axis Z direction of the valve sleeve 3, this cylindrical body 4 comes into contact with the restricting portion 21. Therefore, with this construction, movement of the cylindrical body 4 in the axis Z direction of the valve sleeve 3 can be restricted in a reliable manner.

The restricting portion 21 comes into contact with the end face of the other end portion 20 of the cylindrical body 4 in the axis Z direction of the valve sleeve 3. With this, when the cylindrical body 4 attempts to move in the axis Z direction of the valve sleeve 3, the end face of the other end portion 20 of this cylindrical body 4 comes into contact with the restricting portion 21. Therefore, the movement of the cylindrical body 4 can be restricted immediately.

Second Embodiment

In the foregoing embodiment, the cylinder head cover 5 includes the interior-facing face engaging part 19b as a parallel face extending parallel with the axis Z direction of the valve sleeve 3, as the engaging portion 19 engageable with the interior-facing face 15b facing the interior radially of the valve sleeve 3 at the one end portion 14 of the cylindrical body 4. However, the invention is not limited thereto.

Figure 4:
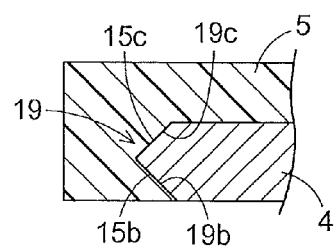
FIG. 4 is a vertical section of principal portions showing a second embodiment.

For instance, as shown in FIG. 4, in case the interior-facing face 15b is formed as an interior-facing inclined face inclined to face the radial interior of the cylindrical body, the interior-facing face engaging part 19b can be embodied as an inclined face corresponding to this interior-facing face (interior-facing inclined face) 15b.

Figure 5:
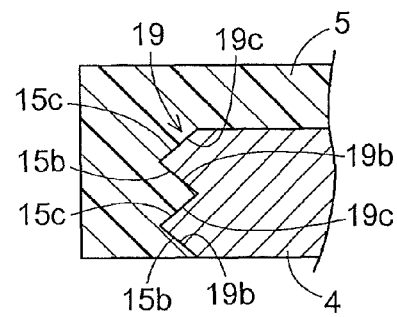
FIG. 5 is a vertical section of principal portions showing the second embodiment.

Further, as shown in FIG. 5, this interior-facing inclined face 15b can be provided in a plurality. In this case, the cylinder head cover 5 is to include a plurality of the interior-facing face engaging parts 19b corresponding to the interior-facing inclined faces 15b.

Third Embodiment

Figure 6:
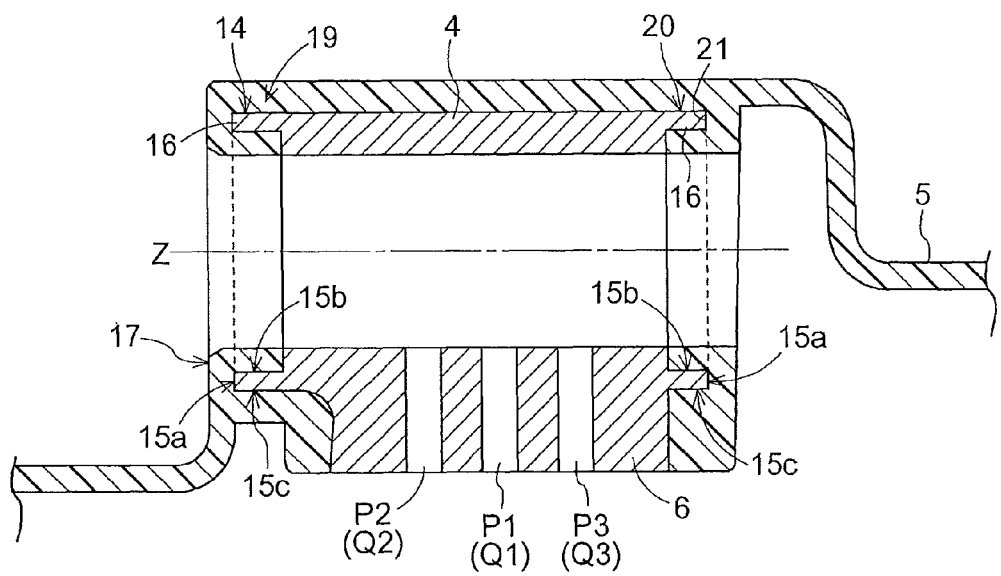
FIG. 6 is a vertical section of principal portions showing a third embodiment.

FIG. 6 shows a further embodiment of the oil control valve mounting arrangement. In this embodiment, on opposed end portions of the cylindrical body 4, flanges 16 are formed respectively. And, at the one end portion 14 and the other end portion 20 of the cylindrical body 4, in order to restrict displacement of the cylinder head cover 5 away from the cylindrical body 4 in the radial direction of the valve sleeve 3, the cylinder head cover 5 is engaged with the end face 15a, the interior-facing face 15b and the exterior-facing face 15c of the cylindrical body 4, along the entire perimeters thereof.

With this embodiment, looseness or displacement between the cylindrical body 4 and the cylinder head cover 5 in the radial direction of the valve sleeve 3 can be prevented effectively.

The rest of the construction of this further embodiment is identical to the first embodiment.

Fourth Embodiment

Though not shown, an end portion of the case 10 of the solenoid mechanism 1 may be fitted inside the cover portion 17 surrounding and holding the one end portion 14 of the cylindrical body 4 and an O-ring like elastic member 18 contacting this cover portion 17 (engaging portion 19) may be provided on the case 10 on its side closer to the axis Z of the valve sleeve 3 than the cover portion 17.

The rest of the construction of this further embodiment is identical to the first embodiment.

Fifth Embodiment

Figure 7:
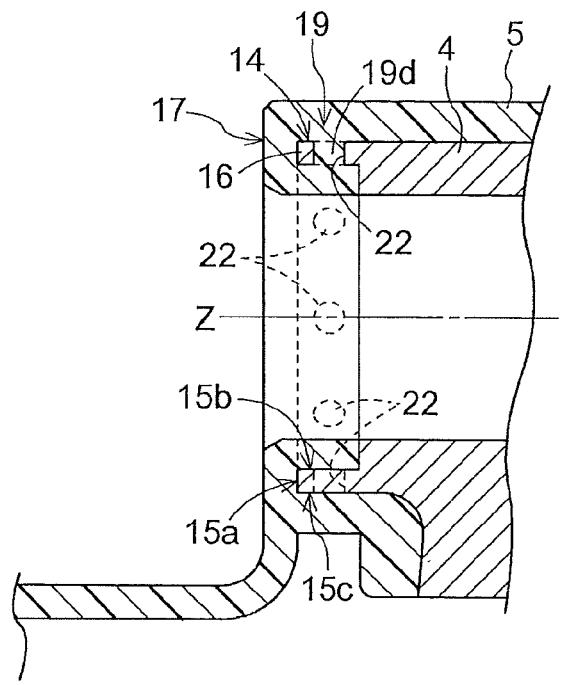
FIG. 7 is a vertical section of principal portions showing a fifth embodiment.
Figure 11:
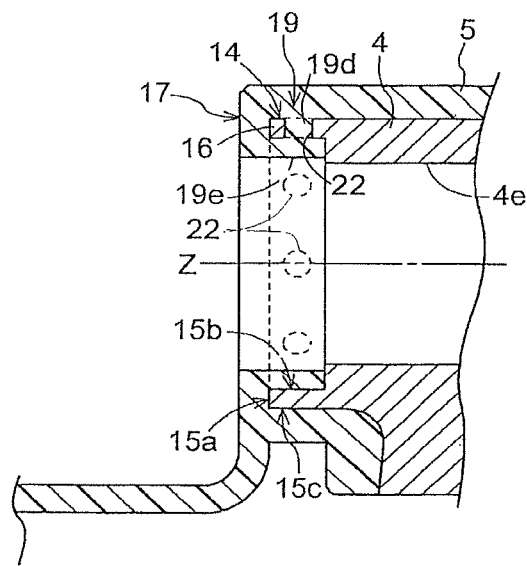
FIG. 11 is a vertical section of principal portions showing another embodiment.
Figure 12:
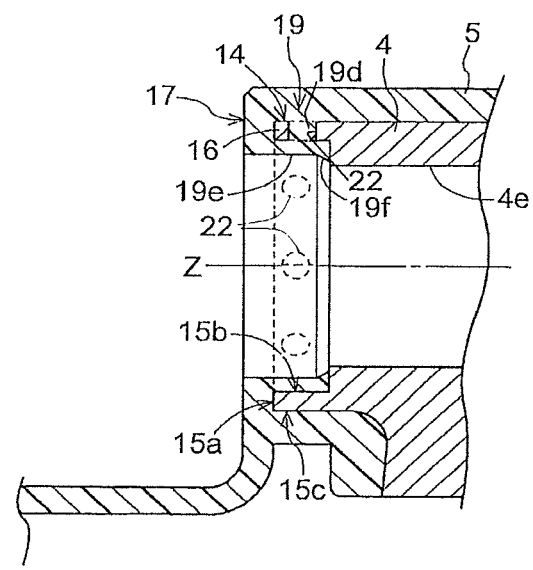
FIG. 12 is a vertical section of principal portions showing another embodiment.

In the foregoing embodiment, at the one end portion 14 of the cylindrical body 4 in the axis Z direction of the valve sleeve 3, the cylindrical body 4 can include a radial hole 22 extending through in the radial direction of the valve sleeve 3 and the engaging portion 19 can include a convex portion 19d engageable with the radial hole 22 (FIG. 7). As shown in FIGS. 11 and 12, one embodiment may include the radial holes 22, wherein with respect to the faces of the engaging portion 19, one face 19e thereof in opposition to the valve sleeve 3 is positioned more outward in the radial direction of the valve sleeve 3 than a face 4e of the cylindrical body 4 in opposition to the valve sleeve 3.

With the above-described construction, at the time of the molding operation of the cylinder head cover 5, it is possible to create a flow of resin flowing through the radial hole 22 and a further flow of resin flowing past the perimeter of the flange 16 portion. Therefore, even if there occurs a drop in the injection pressure of the resin during the molding operation, with either one of these resin flows, the resin can be distributed with ease in a uniform manner to form the engaging portion 19 as a whole. That is, as it is possible to prevent occurrence of any area not filled with resin, the cover as a whole can be molded in a reliable manner.

Furthermore, as the radial hole 22 is filled with the resin, the bonding between the cylinder head cover 5 and the one end portion of the cylindrical body 4 can be further reinforced.

Sixth Embodiment

Figure 8:
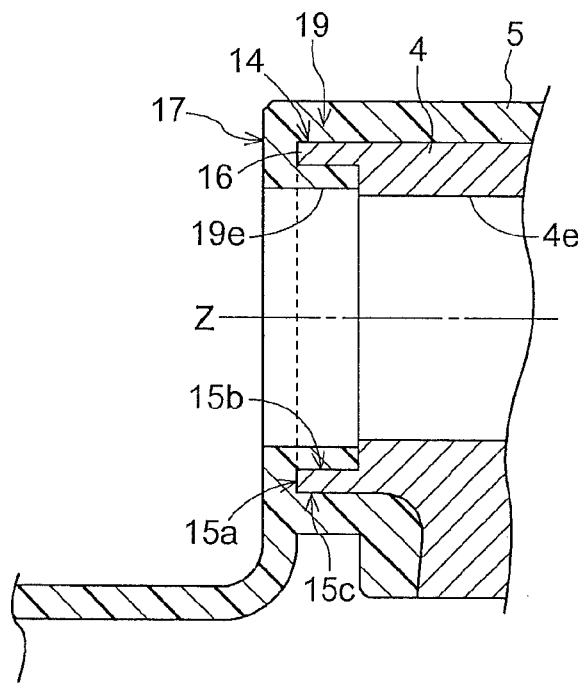
FIG. 8 is a vertical section of principal portions showing a sixth embodiment.

In the foregoing embodiment, of faces of the engaging portion 19, one face 19e thereof in opposition to the valve sleeve 3 can be positioned more outward in the radial direction of the valve sleeve 3 than a face 4a of the cylindrical body 4 in opposition to the valve sleeve 3 (FIG. 8).

If the face 19e of the faces of the engaging portion 19 in opposition to the valve sleeve 3 and the face 4a of the cylindrical body 4 in opposition to the valve sleeve 3 are formed flush with each other, during the molding operation, there is the possibility of an amount of resin leaking into the valve sleeve 3.

Figure 10:
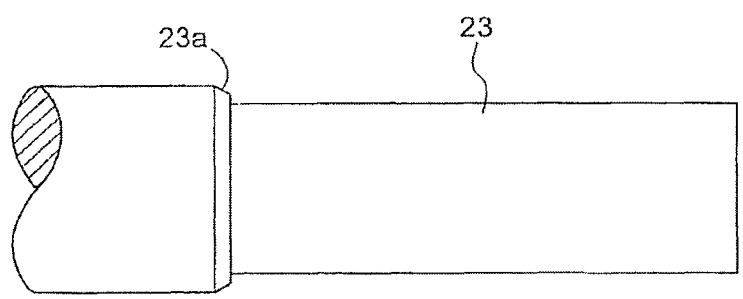
FIG. 10 is a vertical section of a slide pin.

On the other hand, in the case of the above-described construction, the face 19e of the faces of the engaging portion 19 in opposition to the valve sleeve 3 is disposed on more outer side in the radial direction of the valve sleeve 3 than the face 4a of the cylindrical body 4 in opposition to the valve sleeve 3, that is, one of the faces of the engaging portion in opposition to the valve sleeve has a tapered portion which progressively reduces the radial length of the valve sleeve. These faces are not formed in flush with each other. In this way, by providing a step between these two faces, when, at the time of resin molding operation, a slide pin 23 (FIG. 10) is inserted into the cylindrical body 4 and an amount of resin is charged therein for forming the cylinder head cover 5, intrusion or leakage of the resin between the slide pin 23 and the cylindrical body 4 will hardly occur.

Figure 9:
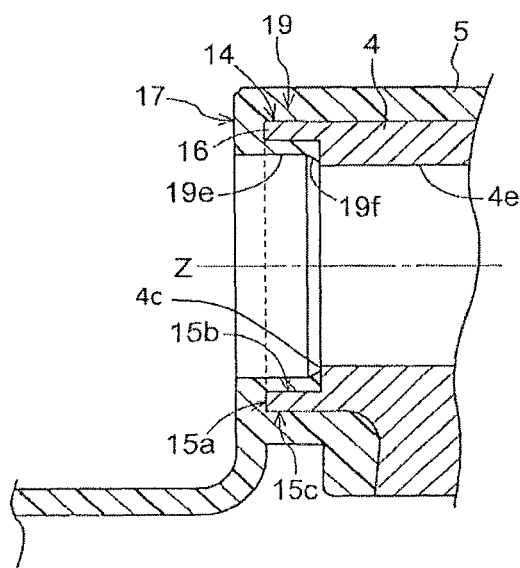
FIG. 9 is a vertical section of principal portions showing the sixth embodiment.

In the instant embodiment, of faces of the engaging portion 19, one face 19e thereof in opposition to the valve sleeve 3 has a tapered portion 19f which progressively decreases the radial length of the valve sleeve 3 (FIG. 9). An advancing direction of the valve sleeve is the axial direction from the one end portion 14 of the cylindrical body 4 towards the other end portion 20 of the cylindrical body.

As shown in FIG. 9, the radially innermost face 19e of the engaging portion 19 that opposes the valve sleeve 3 includes the first tapered portion 19f which progressively decreases in distance from the axis Z of the valve sleeve 3 towards the other end portion 20 in the advancing direction of the valve sleeve 3). In other words, the taper angle of this tapered portion 19f should be set such that the diameter progressively decreases toward the inner side of the valve sleeve 3 (i.e., the diameter of the first tapered portion 19f progressively decreases towards the radially innermost face 4e of the cylindrical body 4 that opposes the valve sleeve 3 in the advancing direction of the valve sleeve 3).

As shown in FIG. 9, a boundary face 4c extends in the radial direction of the valve sleeve 3 between the radially innermost part of the tapered portion 19f (i.e., the radially innermost face of the engaging portion that opposes the valve sleeve) and the radially innermost face 4e of the cylindrical body 4 that opposes the valve sleeve. The first tapered portion 19f contacts the boundary face 4c at the radially innermost part of the first tapered portion 19f. As FIG. 9 also shows, the radially innermost part of the first tapered portion 19f that contacts the boundary face 4c is positioned more outward in the radial direction of the valve sleeve 3 than the radially innermost face of the cylindrical body 4e that opposes the valve sleeve.

In correspondence with the above construction, if a portion of the slide pin 23 to be inserted at the time of molding operation which portion comes into contact with the tapered portion 19f is formed as a tapered portion 23a to correspond in shape to this tapered portion 19f (FIG. 10), in the course of removal of this slide pin, the slide pin can be oriented at an angle facilitating detachment of the slide pin from the solidified resin. The first tapered portion 19f may thus be configured to contact and correspond in shape to a second tapered portion 23a of the slide pin 23 inserted into the cylindrical body 4 upon molding the resin cover 5. The valve sleeve 3 is configured to be inserted from the outer to inner side of the cylindrical body 4 in the axial direction of the valve sleeve 3, and the first tapered portion 19f is positioned more inward than the outermost position of the cylindrical body 4 as illustrated in FIG. 9. Therefore, the removal of the slide pin can be facilitated and can be effected smoothly.

INDUSTRIAL APPLICABILITY

The present invention can be applied to an oil control valve mounting arrangement including a resin cover with a metal cylindrical body insert-molded therein, a valve sleeve housed within the cylindrical body, and a spool inserted in the valve sleeve.

DESCRIPTION OF REFERENCE MARKS/NUMERALS 2 spool
3 valve sleeve
4 cylindrical body
4a face of cylindrical body in opposition to the valve sleeve
4c boundary face of the cylindrical body extending in the radial direction of the valve sleeve
5 cover
14 one end portion
15b interior-facing face of the cylindrical body
15c exterior-facing face of the cylindrical body
16 flange
16a inner peripheral face
16b outer peripheral face
18 sealing member
19 engaging portion
19d convex portion
19e one face of faces of the engaging portion in opposition to the valve sleeve
19f tapered portion
19b interior-facing face engaging part
20 the other end portion
21 restricting portion
22 radial hole

The invention claimed is:
1. An oil control valve mounting arrangement comprising a resin cover with a metal cylindrical body insert-molded therein, a valve sleeve housed within the cylindrical body, and a spool inserted in the valve sleeve;
   wherein in at least at one end portion of the cylindrical body in an axial direction of the valve sleeve, the cover includes an engaging portion engageable with an interior-facing face of the cylindrical body facing a radially inner side of the valve sleeve at an end of the cylindrical body in the axial direction of the valve sleeve so as to restrict displacement of the cover away from the cylindrical body in a radial direction of the valve sleeve;
   wherein in an other end portion of the cylindrical body in the axial direction of the valve sleeve, the cover includes a restricting portion for restricting movement of the cylindrical body; and
   wherein a radially innermost face of the engaging portion in opposition to the valve sleeve is positioned more outward in the radial direction of the valve sleeve than a radially innermost face of the cylindrical body in opposition to the valve sleeve.

2. The oil control valve mounting arrangement according to claim 1, wherein said interior-facing face and an exterior-facing face at said one end portion of the cylindrical body are surrounded by and held within said engaging portion.

3. The oil control valve mounting arrangement according to claim 1, wherein in at least one end portion of the cylindrical body in the axial direction of the valve sleeve, the cylindrical body includes a flange forming an inner peripheral face having a greater diameter than the diameter of the valve sleeve.

4. The oil control valve mounting arrangement according to claim 3, wherein the inner peripheral face of the flange and an outer peripheral face of the flange are surrounded by and held within said engaging portion.

5. The oil control valve mounting arrangement according to claim 1, wherein said engaging portion includes a parallel face that extends parallel with the axial direction of the valve sleeve and that is engageable with an inner peripheral face.

6. The oil control valve mounting arrangement according to claim 1, wherein a sealing member is provided between said engaging portion and the valve sleeve.

7. The oil control valve mounting arrangement according to claim 6, wherein the sealing member contacting said engaging portion is provided closer to an axis of the valve sleeve than said cover.

8. The oil control valve mounting arrangement according to claim 1, wherein said restricting portion is formed to extend toward an axis of the valve sleeve.

9. The oil control valve mounting arrangement according to claim 1, wherein said restricting portion is configured to come into contact with a face on the other end portion of the cylindrical body in the axial direction of the valve sleeve.

10. The oil control valve mounting arrangement according to claim 1, wherein at one end portion of the cylindrical body in the axial direction of the valve sleeve, the cylindrical body includes a radial hole extending through in the radial direction of the valve sleeve and said engaging portion includes a convex portion engageable with said radial hole.

11. The oil control valve mounting arrangement according to claim 1, wherein a portion of the engaging portion comprises, one face in opposition to the valve sleeve, said face having a tapered portion whose distance from an axis of the valve sleeve gradually decreases towards an inside of the valve sleeve and said tapered portion is disposed at a portion facing the inside of the valve sleeve.

12. The oil control valve mounting arrangement according to claim 1, wherein the radially innermost face of the engaging portion in opposition to the valve sleeve and the radially innermost face of the cylindrical body in opposition to the valve sleeve together form a step.

13. The oil control valve mounting arrangement according to claim 12, wherein the radially innermost face of the engaging portion in opposition to the valve sleeve and the radially innermost face of the cylindrical body in opposition to the valve sleeve are positioned adjacent each to other in the axial direction of the valve sleeve.

14. The oil control valve mounting arrangement according to claim 13, wherein the radially innermost face of the engaging portion in opposition to the valve sleeve and the radially innermost face of the cylindrical body in opposition to the valve sleeve are positioned parallel with the axial direction of the valve sleeve.

15. The oil control valve mounting arrangement according to claim 1, wherein
   an advancing direction of the valve sleeve is the axial direction from the one end portion of the cylindrical body towards the other end portion of the cylindrical body,
   the radially innermost face of the engaging portion that opposes the valve sleeve includes a first tapered portion which progressively decreases in distance from an axis of the valve sleeve towards the other end portion of the cylindrical body in the advancing direction of the valve sleeve, and
   a diameter of the first tapered portion progressively decreases towards the radially innermost face of the cylindrical body that opposes the valve sleeve in the advancing direction of the valve sleeve.

16. The oil control valve mounting arrangement according to claim 15, wherein the first tapered portion of the engaging portion is configured to contact and correspond in shape to a second tapered portion of a slide pin inserted into the cylindrical body upon molding the resin cover.

17. The oil control valve mounting arrangement according to claim 16,
   wherein the valve sleeve is configured to be inserted from an outer side to an inner side of the cylindrical body along the axial direction of the valve sleeve, and the first tapered portion is positioned more inward than an outermost position of the cylindrical body.

18. The oil control valve mounting arrangement according to claim 17,
   wherein the cylindrical body includes a boundary face extending in the radial direction of the valve sleeve between the radially innermost face of the engaging portion that opposes the valve sleeve and the radially innermost face of the cylindrical body that opposes the valve sleeve,
   the first tapered portion contacts the boundary face at a radially innermost part of the first tapered portion, and
   the radially innermost part of the first tapered portion that contacts the boundary face being positioned more outward in the radial direction of the valve sleeve than the radially innermost face of the cylindrical body that opposes the valve sleeve.

* * * * *